UNITED STATES PATENT OFFICE.

GEORGE HERBERT GARSTIN, OF SIDNEY, NEW YORK, ASSIGNOR TO PHENIX CHEESE COMPANY, A CORPORATION OF NEW YORK.

CHEESE AND PROCESS FOR STERILIZING SAME.

1,368,624.     Specification of Letters Patent.     Patented Feb. 15, 1921.

No Drawing.     Application filed October 28, 1920. Serial No. 418,320.

*To all whom it may concern:*

Be it known that I, GEORGE HERBERT GARSTIN, a British subject, residing at Sidney, in the county of Delaware and State of New York, have invented certain new and useful Improvements in Cheeses and Processes for Sterilizing the Same, of which the following is a full, clear, and concise description.

My invention relates to the sterilization of cheeses by means of heat applied thereto under proper conditions, the purpose of my improvement being to so prepare the cheese as to give it, when melted and poured into cans, a suitable degree of smoothness and homogeneity, and to enable the cheese, after being thus poured into the cans and during the subsequent step of sterilization by heating, to maintain its smoothness and homogeneity.

My invention further contemplates improvement of cheese by increasing its digestibility and by adding to it a small proportion of a medicinal substance which is harmless and has the properties of a mild laxative and a liver tonic.

My invention is based in part upon the discovery that the properties above set forth as desirable in the cheese are produced by adding to the cheese a small proportion of a salt of orthophosphoric acid.

Under the present practice of sterilizing cheese by heat the cheese is ground up, heated to a temperature somewhat higher than its melting point, stirred for a time by mechanical stirrers, poured into cans and sealed. The cans containing the cheese are then placed in a sterilizer and there heated for a sufficient length of time varying with the character of the cheese, the size of the cheese mass, and within proper limits the temperature, to complete the work of sterilization.

In carrying out the steps of the process just mentioned, however, there arises a difficulty in maintaining the cheese homogeneous. As soon as the cheese is heated to a temperature much above its melting point and high enough to enable it to be poured into cans, the cheese begins to disintegrate. That is to say, the heat causes the butter fats to separate from the casein and to float upon the surface thereof. Except under special conditions it is not an easy matter to prevent this disintegration of the cheese, or to cause the butter fats and casein, after their disintegration, to reunite into a homogeneous mass of the requisite smoothness. For this purpose it has in some instances been advisable to add to the cheese some material for use as a mulsifier.

I find that tertiary sodium phosphate ($Na_3PO_4$), designated in the *United States Pharmacopœia* as medicinal sodium phosphate and which is the neutral salt of orthophosphoric acid, is an ideal substance for the purpose of maintaining the homogeneity of the cheese and of accomplishing the other results above contemplated. It is used to the best advantage upon cheeses which have no material acid qualities. English dairy cheese and other cheeses of the Cheddar genus, if not unduly aged, and various other kinds of cheeses if not rendered acid either by fermentation or by the use of a sour curd, may be treated in connection with the tertiary sodium phosphate.

I also find that if a cheese, for instance an English dairy or other cheese of the Cheddar genus, is very old and over-ripe and thus has become slightly alkaline owing to the presence of ammonia, it is practicable to use the acid sodium phosphate ($NaH_2PO_4$), or in other words the primary sodium phosphate, to accomplish the result.

I proceed as follows:

To each 100 pounds of cheese, ground up or otherwise comminuted, I add 5 pounds of the sodium phosphate and 5 to 10 pounds of water, the sodium phosphate being in the form of a dry powder which dissolves in the water and therewith becomes incorporated in the cheese. The cheese mass is now placed in a steam-jacketed kettle and stirred by mechanical stirrers until formed into a smooth, semi-liquid mass having the consistency of very thick, condensed milk and entirely free from all lumps. The mass should be heated and stirred as described until it reaches a temperature of about 180 degrees Fahrenheit, the time being preferably from thirty to forty-five minutes. However, the length of time required to bring the mass to the required degree of smoothness is a matter of experience and judgment on the part of the operator, and of course varies with the kind and condition of the cheese. The object is to obtain a smooth, semi-liquid mass of the consistency of condensed milk and which will readily flow into tin cans, and for this purpose the temperature and the length of time required for the purpose may be varied as required.

The cheese mass is next caused to flow into tin cans which are paper lined, and the cans are closed and sealed in the conventional manner, usually upon an automatic sealing machine. The seal should be hermetical.

Next the cans, now filled and sealed, are placed in a sterilizer and subjected to a temperature of 230 degrees Fahrenheit for a period of time, varying from forty minutes for cans of small size to an hour and a half for cans of large size—say five pounds capacity. However, a somewhat lower degree of heat coupled with a longer time or a somewhat higher degree of heat with a shorter time, can accomplish approximately the same result.

This completes the sterilizing process.

I find that by treating the cheese as above described its flavor is not impaired and is changed but slightly if at all, and that its odor is not affected, or at least not affected injuriously.

The precise manner in which the sodium phosphate acts upon the cheese is problematical. It seems probable, however, that it acts upon the albumin contained, and its effect upon the casein is quite marked, as the entire cheese mass is converted into a smooth mass, and is easily digested.

It seems highly probable that the sodium phosphate has a food value, as both sodium salts and potassium salts are found in the human body and are considered essential thereto.

While my invention may be used to advantage in connection with cheeses of many different varieties, it is peculiarly well adapted for use with cheeses of the Cheddar genus, including English dairy. It is also well adapted for use with cheeses of the Swiss and Camembert types.

During the process above described there is a little evaporation of the water during the time in which the cheese is heated before the cans are sealed. In the finished article, the percentage of the contained sodium phosphate is approximately five per cent. This percentage may be varied within narrow limits, but if the content of the sodium phosphate be less than five per cent. there is danger of impairing the homogeneity of the cheese mass, either before or after it is poured into cans.

The cheese treated and canned as above described is in appearance, taste and smell very much like cheese sterilized in the manner well known in this art.

I do not limit myself to the exact process or to the specific article above described, as variations may be made therefrom without departing from my invention, the spirit of which is commensurate with my claims.

Having thus described my invention, what I claim as new and desire to secure by Letters Patent is as follows:

1. The method, herein described, of treating cheese; which consists in comminuting the cheese, adding to it a small proportion of sodium phosphate, and sterilizing the resulting mass.

2. The process, herein described, of treating cheese; which consists in comminuting the cheese, adding to it approximately five per cent. by weight of sodium phosphate, and sterilizing the resulting mass.

3. The process herein described of treating cheese; which consists in comminuting the cheese, melting and stirring said cheese, adding to said cheese a salt of orthophosphoric acid, and sterilizing the resulting mass.

4. As an article of manufacture, cheese containing a salt of phosphoric acid and sterilized.

5. As an article of manufacture, sterilized cheese containing tertiary sodium phosphate.

6. As an article of manufacture, a cheese of the Cheddar genus containing a salt of orthophosphoric acid and sterilized.

7. As an article of manufacture, a cheese of the Cheddar genus containing sodium phosphate and sterilized.

8. As an article of manufacture, English dairy cheese containing sodium phosphate and sterilized.

9. As an article of manufacture, a sterilized cheese of the Cheddar genus containing sodium phosphate and hermetically sealed in a can.

GEORGE HERBERT GARSTIN.